US011350245B2

(12) United States Patent
Opshaug et al.

(10) Patent No.: US 11,350,245 B2
(45) Date of Patent: May 31, 2022

(54) TIME-DOMAIN PROCESSING FOR POSITIONING SIGNALS

(71) Applicant: QUALCOMM Incorporated, San Diego, CA (US)

(72) Inventors: Guttorm Ringstad Opshaug, Redwood City, CA (US); Weimin Duan, San Diego, CA (US); Alexandros Manolakos, Escondido, CA (US); Sony Akkarakaran, Poway, CA (US); Charles Edward Wheatley, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/325,014

(22) Filed: May 19, 2021

(65) Prior Publication Data

US 2021/0368298 A1 Nov. 25, 2021

Related U.S. Application Data

(60) Provisional application No. 63/029,201, filed on May 22, 2020.

(51) Int. Cl.
*H04W 4/029* (2018.01)
*G01S 5/02* (2010.01)
*H04L 27/26* (2006.01)
*H04L 5/00* (2006.01)

(52) U.S. Cl.
CPC ........... *H04W 4/029* (2018.02); *G01S 5/0226* (2013.01); *H04L 5/0048* (2013.01); *H04L 27/261* (2013.01)

(58) Field of Classification Search
CPC .... H04W 4/029; H04L 5/0048; H04L 27/261; G01S 5/0226
See application file for complete search history.

(56) References Cited

U.S. PATENT DOCUMENTS

| 9,686,715 | B2* | 6/2017 | Mirbagheri | ............... G01S 1/20 |
| 2011/0205122 | A1 | 8/2011 | Siomina et al. | |
| 2012/0044796 | A1* | 2/2012 | Yoon | ..................... H04L 27/261 370/208 |
| 2018/0054286 | A1* | 2/2018 | Tang | ..................... H04L 5/0048 |
| 2019/0327673 | A1 | 10/2019 | Bitra et al. | |
| 2020/0128436 | A1* | 4/2020 | Chae | ................ H04W 28/0289 |
| 2020/0177338 | A1* | 6/2020 | Zhang | .................. H04W 72/04 |

OTHER PUBLICATIONS

International Search Report and Written Opinion—PCT/US2021/033413—ISA/EPO—dated Oct. 1, 2021.

(Continued)

*Primary Examiner* — Kabir A Timory
(74) *Attorney, Agent, or Firm* — Weaver Austin Villeneuve & Sampson LLP

(57) ABSTRACT

Techniques are provided for time-domain processing of DL-PRS signals under certain conditions in which time-domain processing has a computational advantage over frequency-domain processing. Because of this, embodiments can provide positioning at a lower computational cost than positioning provided by traditional techniques utilizing only frequency-domain processing. This reduced computational cost can improve the battery life of mobile devices, ultimately resulting in a better user experience.

28 Claims, 10 Drawing Sheets

(56) References Cited

OTHER PUBLICATIONS

Panchetti M., et al., "Performance Analysis of PRS-Based Synchronization Algorithms for LTE Positioning Applications", Positioning Navigation and Communication (WPNC), 2013 10th Workshop on, IEEE, Mar. 20, 2013 (Mar. 20, 2013), pp. 1-6, XP032678768, DOI: 10.1109/WPNC.2013.6533292 ISBN: 978-1-4673-6031-9 [Retrieved on Jun. 14, 2013] the whole document.

\* cited by examiner

Computational complexity example
272 RBs total (3264 sub-carriers) with 4096 FFT and IFFT sizes Upper table 610

| Computational complexity FD-methods (MAC) | Comb-1/1symbol (1 FFT) | Comb-2/2-symbol (2 FFTs) | Comb-4/4-symbol (4 FFTs) | Comb-6/6-symbol (6 FFTs) | Comb-12/12-symbol (12 FFTs) |
|---|---|---|---|---|---|
| FFT | 24,576 | 49,152 | 98,304 | 147,456 | 294,912 |
| FD correlation | 3,264 | 3,264 | 3,264 | 3,264 | 3,264 |
| IFFT | 24,576 | 24,576 | 24,576 | 24,576 | 24,576 |
| Total | 52,416 | 76,992 | 126,144 | 175,296 | 322,752 |

Lower table 620

| Computational complexity TD method 4096 MACs/Tap | Comb-1/1symbol (1 FFT) | Comb-2/2-symbol (2 FFTs) | Comb-4/4-symbol (4 FFTs) | Comb-6/6-symbol (6 FFTs) | Comb-12/12-symbol (12 FFTs) |
|---|---|---|---|---|---|
| Break-even #Taps w.r.t FD-method | 12.8 | 18.8 | 30.8 | 42.8 | 78.8 |

FIG. 6

TIME-DOMAIN PROCESSING FOR POSITIONING SIGNALS

RELATED APPLICATIONS

This application claims the benefit of U.S. Provisional Application No. 63/029,201, filed May 22, 2020, entitled "TIME-DOMAIN PROCESSING FOR SUBSET OF OFDM SIGNAL TYPES", which is assigned to the assignee hereof, and incorporated herein in its entirety by reference.

BACKGROUND

1. Field of Disclosure

The present disclosure relates generally to the field of wireless communications, and more specifically to processing a downlink Positioning Reference Signal (DL-PRS) at a User Equipment (UE).

2. Description of Related Art

In a data communication network, various positioning techniques can be used to determine the location of a mobile electronic device (referred to herein as a "UE"). Some of these positioning techniques may utilize a time measurement of one or more DL-PRS signals transmitted by one or more base stations. When DL-PRS signals are used, they are processed by the UE and used, by the UE or another device communicatively coupled therewith, to determine the location of the UE.

SUMMARY

Techniques are provided for time-domain processing of DL-PRS signals under certain conditions in which time-domain processing has a computational advantage over frequency-domain processing. Because of this, embodiments can provide positioning at a lower computational cost than positioning provided by traditional techniques utilizing only frequency-domain processing. This reduced computational cost can improve the battery life of mobile devices, ultimately resulting in a better user experience.

An example method of signal processing at a User Equipment (UE), according to this disclosure, comprises obtaining a location estimate of the UE with a corresponding location uncertainty estimate determining a reduced search time window for detecting a downlink Positioning Reference Signal (DL-PRS), based at least in part on the location uncertainty estimate. The method also comprises comparing the reduced search time window to a threshold search time window value for time-domain processing of the DL-PRS. The method also comprises determining whether a reduced interference condition is met. The method also comprises receiving the DL-PRS via one or more orthogonal frequency-division multiplexing (OFDM) resource blocks. The method also comprises responsive to determining the reduced search time window does not exceed the threshold search time window value and the reduced interference condition is met, processing the DL-PRS using time-domain processing.

An example device), according to this disclosure, comprises a communication interface, a memory, and one or more processing units communicatively coupled with the communication interface and memory. The one or more processing units are configured to obtain a location estimate of the UE with a corresponding location uncertainty estimate. The one or more processing units are also configured to determine a reduced search time window for detecting a downlink Positioning Reference Signal (DL-PRS), based at least in part on the location uncertainty estimate. The one or more processing units are also configured to compare the reduced search time window to a threshold search time window value for time-domain processing of the DL-PRS. The one or more processing units are also configured to determine whether a reduced interference condition is met. The one or more processing units are also configured to receive the DL-PRS via one or more orthogonal frequency-division multiplexing (OFDM) resource blocks. The one or more processing units are also configured to, responsive to determining the reduced search time window does not exceed the threshold search time window value and the reduced interference condition is met, process the DL-PRS using time-domain processing.

Another example device, according to this disclosure, comprises means for obtaining a location estimate of a user equipment (UE) with a corresponding location uncertainty estimate. The device also comprises means for determining a reduced search time window for detecting a downlink Positioning Reference Signal (DL-PRS), based at least in part on the location uncertainty estimate. The device also comprises means for comparing the reduced search time window to a threshold search time window value for time-domain processing of the DL-PRS. The device also comprises means for determining whether a reduced interference condition is met. means for receiving the DL-PRS via one or more orthogonal frequency-division multiplexing (OFDM) resource blocks. The device also comprises means for processing the DL-PRS using time-domain processing, responsive to determining the reduced search time window does not exceed the threshold search time window value and the reduced interference condition is met.

An example non-transitory computer-readable medium, according to this disclosure, comprises instructions embedded therewith, which, when executed by one or more processing units, cause the one or more processing units to: obtain a location estimate of a user equipment (UE) with a corresponding location uncertainty estimate. The instructions further comprise code for determining a reduced search time window for detecting a downlink Positioning Reference Signal (DL-PRS), based at least in part on the location uncertainty estimate. The instructions further comprise code for comparing the reduced search time window to a threshold search time window value for time-domain processing of the DL-PRS. The instructions further comprise code for determining whether a reduced interference condition is met. The instructions further comprise code for receiving the DL-PRS via one or more orthogonal frequency-division multiplexing (OFDM) resource blocks. The instructions further comprise code for, responsive to determining the reduced search time window does not exceed the threshold search time window value and the reduced interference condition is met, processing the DL-PRS using time-domain processing.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

FIG. 6 includes two tables showing how the determination of a threshold search time window value may be made, according to an embodiment.

Figure 1:
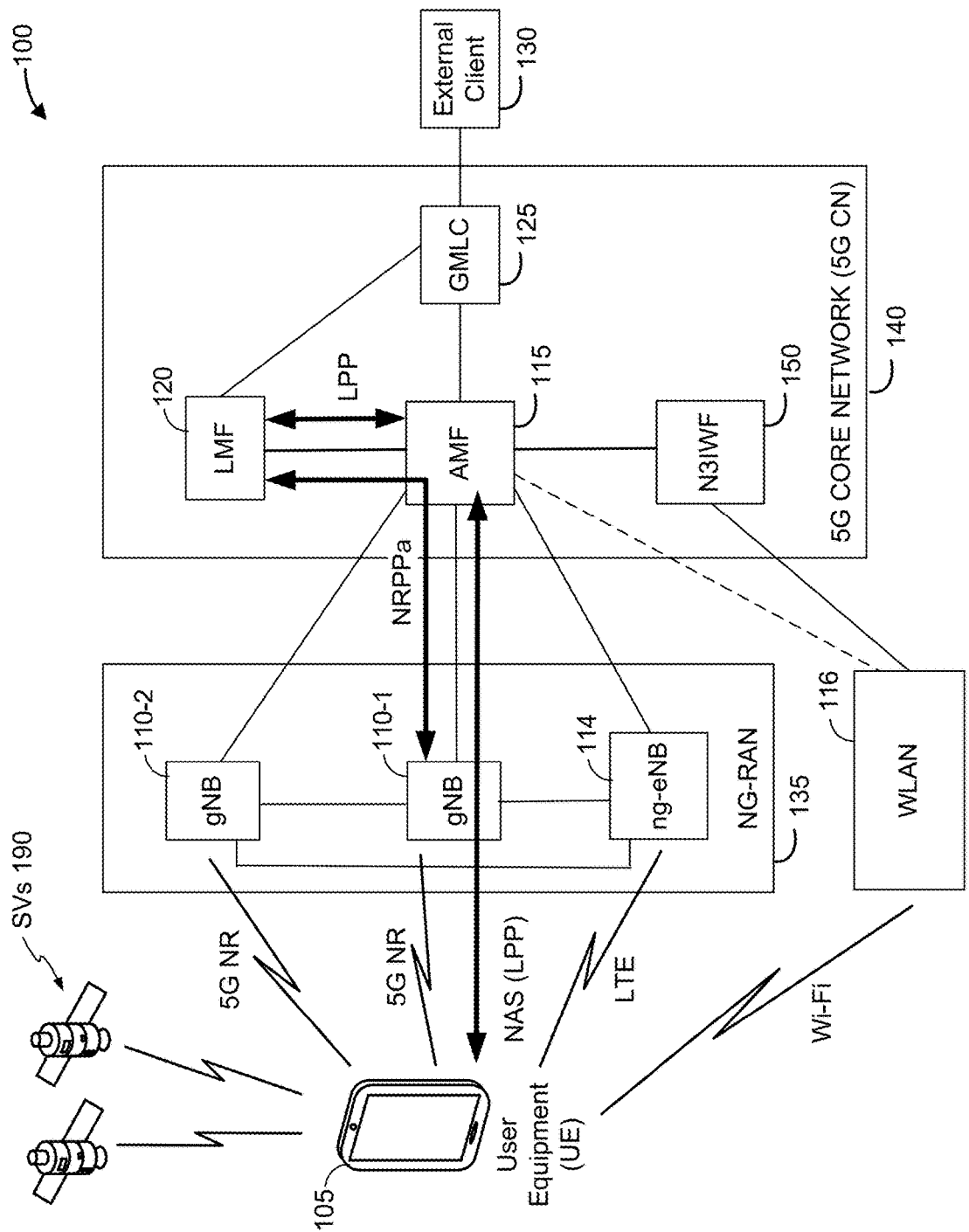
FIG. 1 is a diagram of a communication system, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

Embodiments herein provide an improvement in the reception of DL-PRS signals at a UE by providing for time-domain processing of DL-PRS signals (e.g., by correlating the received signal with what was transmitted) under certain conditions in which time-domain processing has a computational advantage over frequency-domain processing. Because of this, embodiments can provide positioning at a lower computational cost than positioning provided traditional techniques utilizing only frequency-domain processing. This reduced computational cost can improve the battery life of mobile devices, ultimately resulting in a better user experience.

FIG. 1 is a diagram of a communication system 100, according to an embodiment. The communication system 100 may be configured to determine the location of a UE 105 by using access nodes 110, 114, 116 and (optionally) a location server (LMF 120) to implement one or more positioning methods. The term "access node," as used in the embodiments described herein below, is meant to refer to network nodes providing access to the communication system 100. Access nodes may therefore include, but are not necessarily limited to, a gNB 110, ng-eNB 114 or WLAN 116. Here, the communication system 100 comprises a UE 105, and components of a Fifth Generation New Radio (5G NR, also referred to herein as "NR") network comprising a Next Generation (NG) Radio Access Network (RAN) (or "NG-RAN") 135 and a 5G Core Network (5G CN) 140. A 5G network may also be referred to as an NR network, NG-RAN 135 may be referred to as a 5G RAN or as an NR RAN, and 5G CN 140 may be referred to as an NG Core network. Standardization of an NG-RAN and 5G CN is ongoing in the 3rd Generation Partnership Project (3GPP). Accordingly, NG-RAN 135 and 5G CN 140 may conform to current or future standards for 5G support from 3GPP. The communication system 100 may further utilize information from space vehicles (SVs) 190 for a Global Navigation Satellite System (GNSS) like Global Positioning System (GPS), GLONASS, Galileo or Beidou, or some other local or regional Satellite Positioning System (SPS) such as Indian Regional Navigational Satellite System (IRNSS), European Geostationary Navigation Overlay Service (EGNOS), or Wide Area Augmentation System (WAAS). Additional components of the communication system 100 are described below. The communication system 100 may include additional or alternative components.

It should be noted that FIG. 1 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions) may utilize the communication system 100. Similarly, the communication system 100 may include a larger (or smaller) number of SVs 190, gNBs 110, ng-eNBs 114, Wireless Local Area Networks (WLANs) 116, Access and Mobility Functions (AMF)s 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 105 may correspond to a cellphone, smartphone, laptop, tablet, personal data assistant (PDA), tracking device, navigation device, Internet of Things (IoT) device, or some other portable or moveable device. Typically, though not necessarily, the UE 105 may support wireless communication using one or more Radio Access Technologies (RATs) such as using Global System for Mobile Communications (GSM), Code Division Multiple Access (CDMA), Wideband CDMA (WCDMA), Long-Term Evolution (LTE), High Rate Packet Data (HRPD), IEEE 802.11 Wi-Fi®, Bluetooth, Worldwide Interoperability for Microwave Access (WiMAX™), 5G NR (e.g., using the NG-RAN 135 and 5G CN 140), etc. The UE 105 may also support wireless communication using a WLAN 116 which (like the one or more RATs) may connect to other networks, such as the Internet. The use of one or more of these RATs may allow the UE 105 to communicate with an external client 130 (e.g., via elements of 5G CN 140 not shown in FIG. 1, or possibly via a Gateway Mobile Location Center (GMLC) 125) and/or allow the external client 130 to receive location information regarding the UE 105 (e.g., via the GMLC 125).

The UE 105 may include a single entity or may include multiple entities, such as in a personal area network where a user may employ audio, video and/or data I/O devices, and/or body sensors and a separate wireline or wireless modem. An estimate of a location of the UE 105 may be referred to as a location, location estimate, location fix, fix, position, position estimate, or position fix, and may be geodetic, thus providing location coordinates for the UE 105 (e.g., latitude and longitude), which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may also be expressed as an area or volume (defined either geodetically or in civic form) within which the UE 105 is expected to be located with some probability or confidence level (e.g., 67%, 95%). A location of the UE 105 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g., for latitude, longitude, and altitude above or below mean sea level).

Base stations (BSs) in the NG-RAN 135 shown in FIG. 1 may comprise a Transmission Reception Point (TRP), such as a NR NodeB (gNB) 110-1 and 110-2 (collectively and generically referred to herein as gNBs 110) and/or an antenna of a gNB. Pairs of gNBs 110 in NG-RAN 135 may be connected to one another (e.g., directly as shown in FIG. 1 or indirectly via other gNBs 110). Access to the 5G network is provided to UE 105 via wireless communication between the UE 105 and one or more of the gNBs 110, which may provide wireless communications access to the first instance of Core Network, 5G CN 140, on behalf of the UE 105 using 5G NR. 5G NR radio access may also be referred to as NR radio access or as 5G radio access. In FIG. 1, the serving gNB for UE 105 is assumed to be gNB 110-1, although other gNBs (e.g., gNB 110-2) may act as a serving gNB if UE 105 moves to another location or may act as a secondary gNB to provide additional throughput and bandwidth to UE 105.

BSs in the NG-RAN 135 shown in FIG. 1 may also or instead include a next generation evolved Node B, also referred to as an ng-eNB, 114. Ng-eNB 114 may be connected to one or more gNBs 110 in NG-RAN 135 (e.g., directly or indirectly via other gNBs 110 and/or other ng-eNBs). An ng-eNB 114 may provide LTE wireless access and/or evolved LTE (eLTE) wireless access to UE 105. Some gNBs 110 (e.g., gNB 110-2) and/or ng-eNB 114 in FIG. 1 may be configured to function as positioning-only beacons which may transmit signals (e.g., DL-PRS signals) and/or may broadcast assistance data to assist positioning of UE 105 but may not receive signals from UE 105 or from other UEs. It is noted that while only one ng-eNB 114 is shown in FIG. 1, some embodiments may include multiple ng-eNBs 114. Base stations 210, 214 may communicate directly with one another via an Xn communication interface. Additionally or alternatively, base stations 210, 214 may communicate directly or indirectly with other components of the communication system 100, such as the LMF 120 and AMF 115.

Communication system 100 may also include one or more WLANs 116 which may connect to a Non-3GPP InterWorking Function (N3IWF) 150 in the 5G CN 140 (e.g., in the case of an untrusted WLAN 116). For example, the WLAN 116 may support IEEE 802.11 Wi-Fi access for UE 105 and may comprise one or more Wi-Fi access points (APs). Here, the N3IWF 150 may connect to other elements in the 5G CN 140 such as AMF 115. In some embodiments, WLAN 116 may support another RAT such as Bluetooth. The N3IWF 150 may provide support for secure access by UE 105 to other elements in 5G CN 140 and/or may support interworking of one or more protocols used by WLAN 116 and UE 105 to one or more protocols used by other elements of 5G CN 140 such as AMF 115. For example, N3IWF 150 may support IPsec tunnel establishment with UE 105, termination of IKEv2/IPsec protocols with UE 105, termination of N2 and N3 interfaces to 5G CN 140 for control plane and user plane, respectively, relaying of uplink and downlink control plane Non-Access Stratum (NAS) signaling between UE 105 and AMF 115 across an N1 interface. In some other embodiments, WLAN 116 may connect directly to elements in 5G CN 140 (e.g., AMF 115 as shown by the dashed line in FIG. 1) and not via N3IWF 150 (e.g., if WLAN 116 is a trusted WLAN for 5G CN 140). For example, direct connection of WLAN 116 to 5GCN 140 may occur if WLAN 116 is a trusted WLAN for 5GCN 140 and may be enabled using a Trusted WLAN Interworking Function (TWIF) (not shown in FIG. 1) which may be an element inside WLAN 116. It is noted that while only one WLAN 116 is shown in FIG. 1, some embodiments may include multiple WLANs 116.

Access nodes may comprise any of a variety of network entities enabling communication between the UE 105 and the AMF 115. This can include gNBs 110, ng-eNB 114, WLAN 116, and/or other types of cellular BSs. However, access nodes providing the functionality described herein may additionally or alternatively include entities enabling communications to any of a variety of RATs not illustrated in FIG. 1, which may include non-cellular technologies.

In some embodiments, an access node, such as a gNB 110, ng-eNB 114, or WLAN 116 (alone or in combination with other modules/units of the communication system 100), may be configured to, in response to receiving a request for location information for multiple RATs from the LMF 120, take measurements for one of the multiple RATs (e.g., measurements of the UE 105) and/or obtain measurements from the UE 105 that are transferred to the access node using one or more of the multiple RATs. As noted, while FIG. 1 depicts access nodes 110, 114, and 116 configured to communicate according to 5G NR, LTE and Wi-Fi communication protocols, respectively, access nodes configured to communicate according to other communication protocols may be used, such as, for example, a Node B using a WCDMA protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 105, a RAN may comprise an E-UTRAN, which may comprise BSs comprising eNBs supporting LTE wireless access. A core network for EPS may comprise an Evolved Packet Core (EPC). An EPS may then comprise an E-UTRAN plus an EPC, where the E-UTRAN corresponds to NG-RAN 135 and the EPC corresponds to 5G CN 140 in FIG. 1. The methods and techniques described herein for UE 105 positioning using common or generic positioning procedures may be applicable to such other networks.

The gNBs 110 and ng-eNB 114 can communicate with an AMF 115, which, for positioning functionality, communicates with an LMF 120. The AMF 115 may support mobility of the UE 105, including cell change and handover of UE 105 from an access node 110, 114, or 116 of a first RAT to an access node 110, 114, or 116 of a second RAT. The AMF 115 may also participate in supporting a signaling connection to the UE 105 and possibly data and voice bearers for the UE 105. The LMF 120 may support positioning of the UE 105 when the UE 105 accesses the NG-RAN 135 or WLAN 116 and may support position procedures and methods, including UE-assisted/UE-based and/or network-based procedures/methods, such as Assisted GNSS (A-GNSS), Observed Time Difference Of Arrival (OTDOA) (which may be referred to in NR as DL Time Difference Of Arrival (DL-TDOA)), Round-Trip Timing (RTT), Real Time Kinematics (RTK), Precise Point Positioning (PPP), Differential GNSS (DGNSS), Enhanced Cell ID (ECID), angle of arrival (AOA), angle of departure (AOD), WLAN positioning, and/or other positioning procedures and methods. The LMF 120 may also process location services requests for the UE 105 (e.g., received from the AMF 115 or from the GMLC 125). The LMF 120 may be connected to AMF 115 and/or to GMLC 125. The LMF 120 may be referred to by other names such as a Location Manager (LM), Location Function (LF), commercial LMF (CLMF), or value added LMF (VLMF). In some embodiments, a node/system that implements the LMF 120 may additionally or alternatively implement other types of location-support modules, such as an Evolved Serving Mobile Location Center (E-SMLC) or Service Location Protocol (SLP). It is noted that in some embodiments, at least part of the positioning functionality (including determination of a UE's location) may be performed at the UE 105 (e.g., by processing DL-PRS signals transmitted by wireless nodes such as gNBs 110, ng-eNB 114, and/or WLAN 116, and/or using assistance data provided to the UE 105 (e.g., by LMF 120)).

The GMLC 125 may support a location request for the UE 105 received from an external client 130 and may forward such a location request to the AMF 115 for forwarding by the AMF 115 to the LMF 120, or may forward the location request directly to the LMF 120. A location response from the LMF 120 (e.g., containing a location estimate for the UE 105) may be similarly returned to the GMLC 125 either directly or via the AMF 115, and the GMLC 125 may then return the location response (e.g., containing the location estimate) to the external client 130. The GMLC 125 is shown connected to both the AMF 115 and LMF 120 in FIG. 1 though only one of these connections may be supported by 5G CN 140 in some implementations.

As further illustrated in FIG. 1, the LMF 120 may communicate with the gNBs 110 and/or with the ng-eNB 114 using an NR Positioning Protocol A (NRPPa) as defined in 3GPP Technical Specification (TS) 38.445. As further illustrated in FIG. 1, LMF 120 and UE 105 may communicate using an LTE Positioning Protocol (LPP) as defined in 3GPP TS 37.355. Here, LPP messages may be transferred between the UE 105 and the LMF 120 via the AMF 115 and a serving gNB 110-1 or serving ng-eNB 114 for UE 105. For example, LPP messages may be transferred between the LMF 120 and the AMF 115 using messages for service based operations (e.g., based on the Hypertext Transfer Protocol (HTTP)) and may be transferred between the AMF 115 and the UE 105 using a 5G NAS protocol. The LPP protocol may be used to support positioning of UE 105 using UE-assisted and/or UE-based position methods such as A-GNSS, RTK, OTDOA, multi-cell RTT, AOD, and/or ECID. The NRPPa protocol may be used to support positioning of UE 105 using network-based position methods such as, AOA, uplink TDOA (UL-TDOA) and/or may be used by LMF 220 to obtain location related information from gNBs 210 and/or ng-eNB 214, such as parameters defining DL-PRS transmission from gNBs 110 and/or ng-eNB 114.

In the case of UE 105 access to WLAN 116, LMF 120 may use LPPa and/or LPP to obtain a location of UE 105 in a similar manner to that just described for UE 105 access to a gNB 110 or ng-eNB 114. Thus, LPPa messages may be transferred between a WLAN 116 and the LMF 120, via the AMF 115 and N3IWF 150 to support network-based positioning of UE 105 and/or transfer of other location information from WLAN 116 to LMF 120. Alternatively, LPPa messages may be transferred between N3IWF 150 and the LMF 120, via the AMF 115, to support network-based positioning of UE 105 based on location related information and/or location measurements known to or accessible to N3IWF 150 and transferred from N3IWF 150 to LMF 120 using LPPa. Similarly, LPP and/or LPP messages may be transferred between the UE 105 and the LMF 120 via the AMF 115, N3IWF 150, and serving WLAN 116 for UE 105 to support UE assisted or UE based positioning of UE 105 by LMF 120.

In the communication system 100, positioning methods can be categorized as being "UE assisted" or "UE based." This may depend on where the request for determining the position of the UE 105 originated. If, for example, the request originated at the UE (e.g., from an application, or "app," executed by the UE), the positioning method may be categorized as being UE based. If, on the other hand, the request originates from an external client or AF 130, LMF 120, or other device or service within the 5G network, the positioning method may be categorized as being UE assisted (or "network-based").

With a UE-assisted position method, UE 105 may obtain location measurements and send the measurements to a location server (e.g., LMF 120) for computation of a location estimate for UE 105. In addition or as an alternative to the DL-PRS measurements and other position-related information previously described, the location measurements may include one or more of a Received Signal Strength Indication (RSSI), Round Trip signal propagation Time (RTT), Reference Signal Received Quality (RSRQ), Reference Signal Time Difference (RSTD), Time of Arrival (TOA), AOA, Receive Time-Transmission Time Difference (Rx-Tx), Differential AOA (DAOA), AOD, or Timing Advance (TA) for gNBs 110, ng-eNB 114, and/or one or more APs for WLAN 116. Additionally or alternatively, similar measurements may be made of sidelink signals transmitted by other UEs, which may serve as anchor points for positioning of the UE 105 if the positions of the other UEs are known. The location measurements may also or instead include measurements of RAT-independent positioning methods such as GNSS (e.g., GNSS pseudorange, GNSS code phase, and/or GNSS carrier phase for SVs 190), WLAN, etc.

With a UE-based position method, UE 105 may obtain location measurements (which may be the same as or similar to location measurements for a UE assisted position method) and may further compute a location of UE 105 (e.g., with the help of assistance data received from a location server such as LMF 120 or broadcast by gNBs 110, ng-eNB 114, or WLAN 116).

With a network-based position method, one or more BSs (e.g., gNBs 110 and/or ng-eNB 114), one or more APs (e.g., in WLAN 116), or N3IWF 150 may obtain location measurements (e.g., measurements of RSSI, RTT, RSRP, RSRQ, AOA, or TOA) for signals transmitted by UE 105, and/or may receive measurements obtained by UE 105 or by an AP in WLAN 116 in the case of N3IWF 150, and may send the measurements to a location server (e.g., LMF 120) for computation of a location estimate for UE 105.

Positioning of the UE 105 also may be categorized as UL, DL, or DL-UL based, depending on the types of signals used for positioning. If, for example, positioning is based solely on signals received at the UE 105 (e.g., from a base station or other UE), the positioning may be categorized as DL based. On the other hand, if positioning is based solely on signals transmitted by the UE 105 (which may be received by a base station or other UE, for example), the positioning may be categorized as UL based. Positioning that is DL-UL based includes positioning, such as RTT-based positioning, that is based on signals that are both transmitted and received by the UE 105.

Depending on the type of positioning (e.g., UL, DL, or DL-UL based) the types of reference signals used can vary. For DL-based positioning, for example, these signals may comprise PRS (e.g., DL-PRS transmitted by base stations or SL-PRS transmitted by other UEs), which can be used for OTDOA, AOD, and RTT measurements. Other reference signals that can be used for positioning (UL, DL, or DL-UL) may include Sounding Reference Signal (SRS), Channel State Information Reference Signal (CSI-RS), synchronization signals (e.g., synchronization signal block (SSB) Synchronizations Signal (SS)), Physical Uplink Control Channel (PUCCH), Physical Uplink Shared Channel (PUSCH), Physical Sidelink Shared Channel (PSSCH), Demodulation Reference Signal (DMRS), etc. Moreover, reference signals may be transmitted in a Tx beam and/or received in an Rx beam (e.g., using beamforming techniques), which may impact angular measurements, such as AOD and/or AOA.

Figure 2:
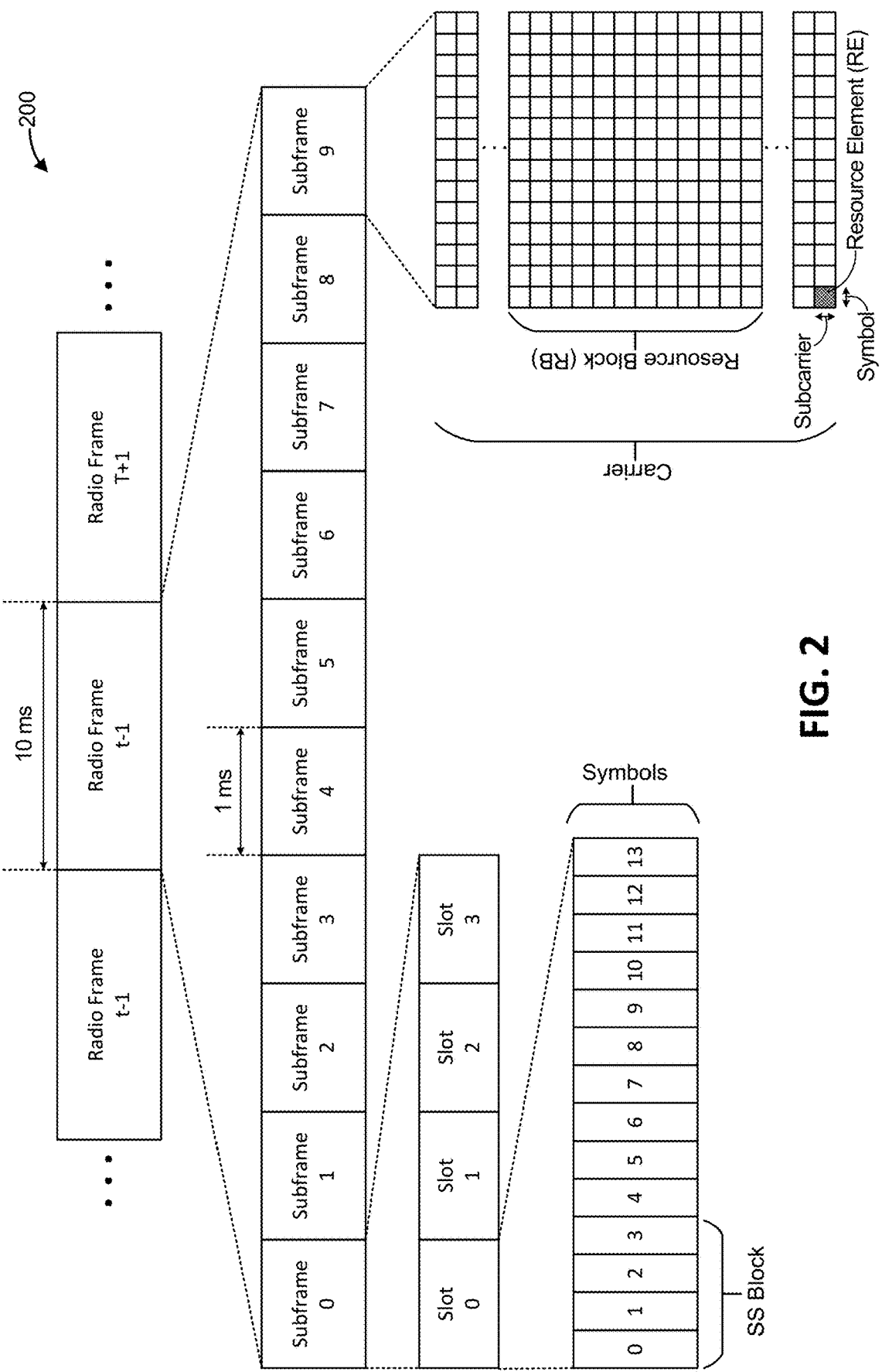
FIG. 2 is a diagram showing an example of a frame structure for New Radio (NR) and associated terminology, which can serve as the basis for physical-layer communication between a user equipment (UE) and base stations (BSs), according to an embodiment.

FIG. 2 is a diagram showing an example of a frame structure 200 for NR and associated terminology, which can serve as the basis for physical-layer communication between the UE 105 and BSs, such as serving gNB 110-1. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot may comprise a sub slot structure (e.g., 2, 3, or 4 symbols). Additionally shown in FIG. 2 is the complete Orthogonal Frequency-Division Multiplexing (OFDM) of a subframe, showing how a subframe can be divided across both time and frequency into a plurality of Resource Blocks (RBs). A single RB can comprise a grid of Resource Elements (REs) spanning 14 symbols and 12 subcarriers.

Each symbol in a slot may indicate a link direction (e.g., downlink (DL), uplink (UL), or flexible) or data transmission and the link direction for each subframe may be dynamically switched. The link directions may be based on the slot format. Each slot may include DL/UL data as well as DL/UL control information. In NR, a synchronization signal (SS) block is transmitted. The SS block includes a primary SS (PSS), a secondary SS (SSS), and a two symbol Physical Broadcast Channel (PBCH). The SS block can be transmitted in a fixed slot location, such as the symbols 0-3 as shown in FIG. 2. The PSS and SSS may be used by UEs for cell search and acquisition. The PSS may provide half-frame timing, the SS may provide the cyclic prefix (CP) length and frame timing. The PSS and SSS may provide the cell identity. The PBCH carries some basic system information, such as DL system bandwidth, timing information within radio frame, SS burst set periodicity, system frame number, etc.

DL-PRS signals transmitted by base stations may utilize multiple RBs. In current implementations of NR, a single DL-PRS can be transmitted using up to 272 RBs (3264 subcarriers). In current deployments, a DL-PRS may utilize different patterns of REs, which may span multiple symbols of an RB. FIGS. 3A-3D provide some examples.

Figure 3A:
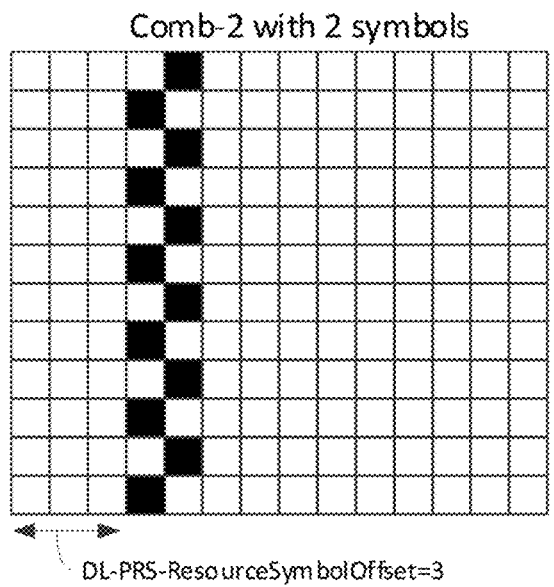
FIGS. 3A-3D are examples of different downlink Positioning Reference Signal (DL-PRS) deployments, according to an embodiment.
Figure 3B:
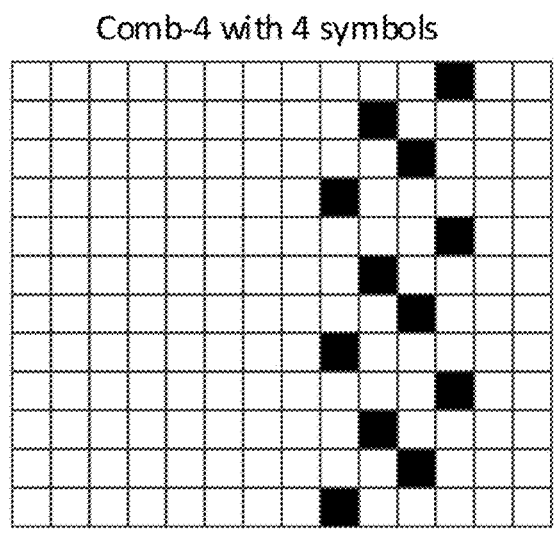
Figure 3C:
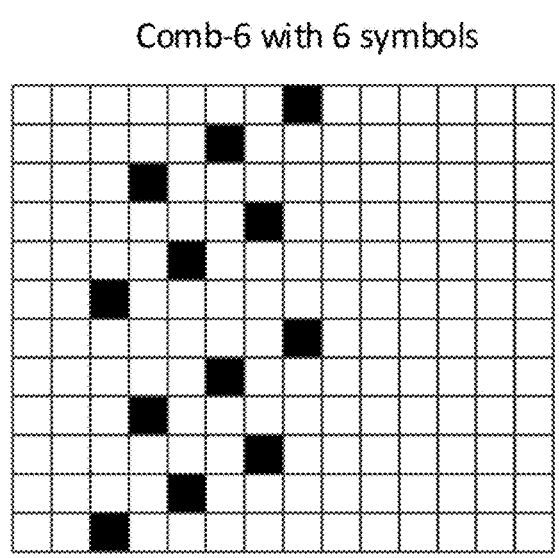
Figure 3D:
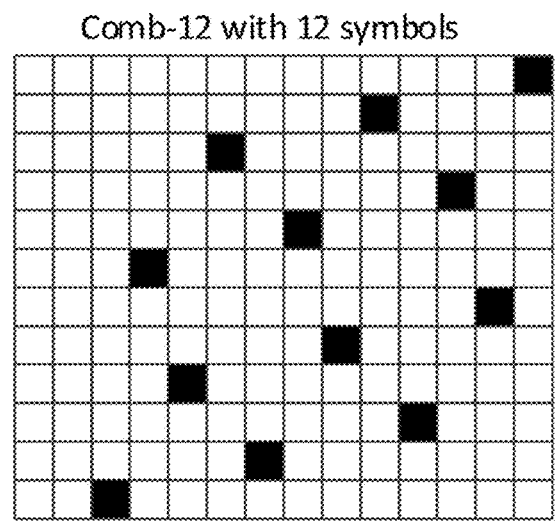

FIGS. 3A-3D are diagrams illustrating examples of different DL-PRS deployments. FIG. 3A, for instance, illustrates a comb-2 deployment spanning two symbols (a two-symbol pattern is repeated for every two subcarriers); FIG. 3B illustrates a comb-4 deployment spanning four symbols (a four-symbol pattern is repeated for every four subcarriers); FIG. 3C illustrates a comb-6 deployment spanning six symbols (a six-symbol pattern is repeated for every six subcarriers); and finally FIG. 3D illustrates a comb-12 deployment spanning 12 symbols (a 12-symbol pattern is repeated for every 12 sub carriers).

DL-PRS deployments spanning multiple symbols do not use every RE of a given symbol, other TRPs may utilize these unused REs to make more efficient use of a given RB.

This can result in multiple TRPs transmitting on different subcarriers for a given symbol. Indeed, because OFDM communications can often result in multiple subcarriers being used simultaneously, devices typically use frequency-domain processing to process signals transmitted using OFDM-based communications.

Figure 4:
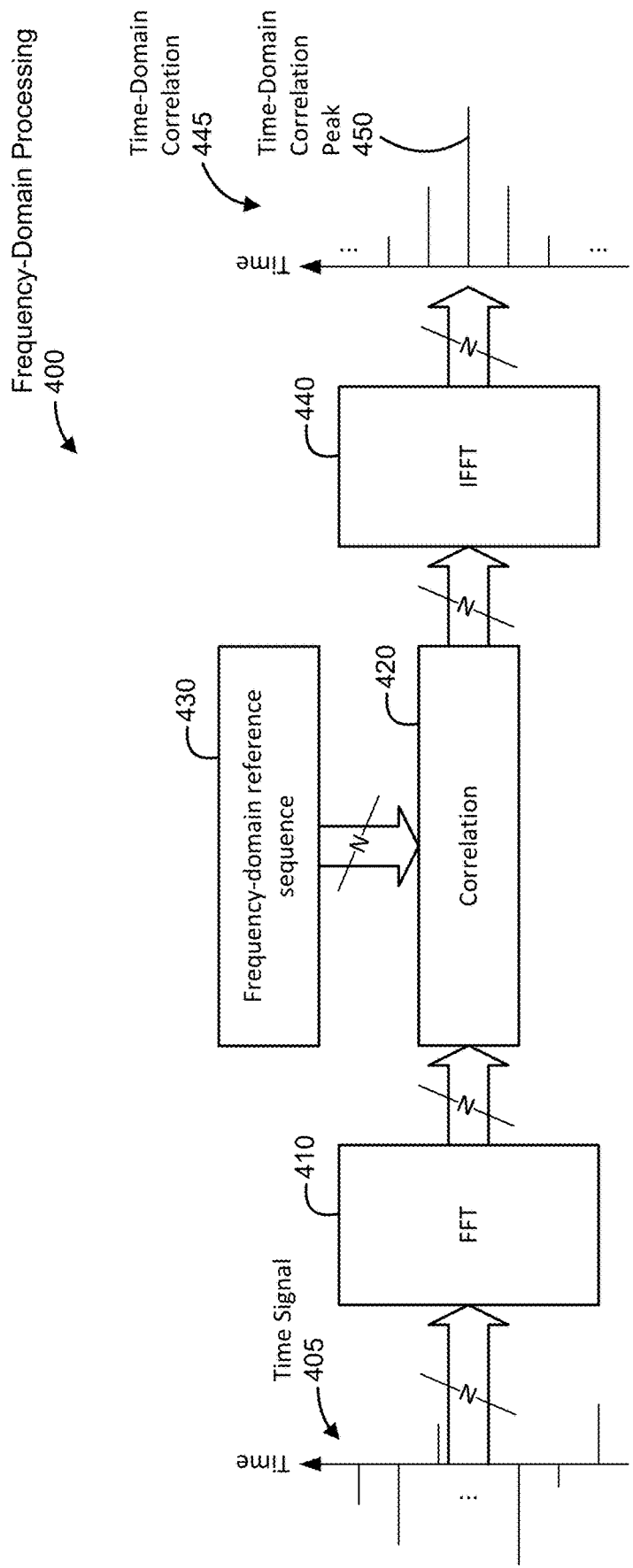
FIG. 4 is a block diagram illustrating frequency-domain processing, according to an embodiment.

FIG. 4 is a block diagram illustrating frequency-domain processing 400, according to an embodiment. Means for performing one or more of the functions illustrated in FIG. 4 can include hardware and/or software components of a UE 105, for example, such as a Digital Signal Processor (DSP) or other processing unit, which may be standalone components or part of a larger subsystem of the UE 105 (e.g., wireless communication interface or modem). Example components of a UE are described hereafter in relation to FIG. 9.

As illustrated, the frequency-domain processing 400 involves sampling an incoming time signal 405 (e.g., a DL-PRS received at an antenna of a UE 105) and performing a Fast Fourier Transform (FFT) 410 to convert the time-domain data to the frequency domain. The frequency-domain processing 400 then performs a correlation 420 in the frequency domain of the converted signal with a frequency-domain reference sequence 430 (here, the frequency-domain reference sequence may represent a frequency-domain representation of the sequence used in DL-PRS (e.g., Gold, Zadoff-Chu)). To convert the correlation back to the time domain, an inverse FFT (IFFT) 440 is performed, outputting the time-domain correlation 445. Using the time-domain correlation peak 450, the UE can determine the time at which the DL-PRS is received. As noted, this measurement can be used by the UE 105 or transmitted to a location server to determine the position of the UE using PRS-based positioning (e.g., OTDOA).

Although useful in extracting OFDM orthogonal signals transmitted in OFDM-based communications, frequency-domain processing 400 can be computationally complex. FFT and IFFT operations typically follow a N/2*log 2(N) cost function, where N is the number of input and output taps. And although it may be feasible to reduce the number of taps used in frequency-domain processing 400 (e.g., processing a smaller time window to obtain the time-domain correlation peak 450 of the DL-PRS signal), producing a variable subset of consecutive output taps of less than N for an IFFT or FFT operation can have additional implementation complexity. Because of this, positioning of a UE 105 can be computationally expensive, consuming large amounts of power. This can be particularly troublesome for battery-powered UEs 105 in which power savings is of high importance.

Embodiments provided herein address these and other issues by leveraging time-domain processing of a DL-PRS to reduce processing complexity when certain conditions are met. These conditions can include reduced radiofrequency (RF) interference and reduced search time window. Thus, embodiments comprise determining, with a UE 105, whether such conditions exist with respect to a given DL-PRS, and, if so, processing the DL-PRS using time-domain processing to effectively determine a time-domain correlation peak in a more efficient manner than frequency-domain processing.

According to some embodiments, the UE 105 can determine whether a reduced interference condition is met before using time-domain processing because time-domain processing can be vulnerable to interference from other RF transmissions transmitted during the DL-PRS. That is, unlike frequency-domain processing, which provides a convenient mechanism for separating the contributions of two or more signals that occupy the same symbol but are OFDM orthogonal, there are no computationally simple time-domain methods to separate signals in the same manner. The reduced interference condition therefore may be met if the UE determines that it is unlikely to experience interference (e.g., from the RF transmissions of other TRPs) when receiving the DL-PRS. This determination can be made in a variety of ways. One example is illustrated in FIG. 5.

Figure 5:
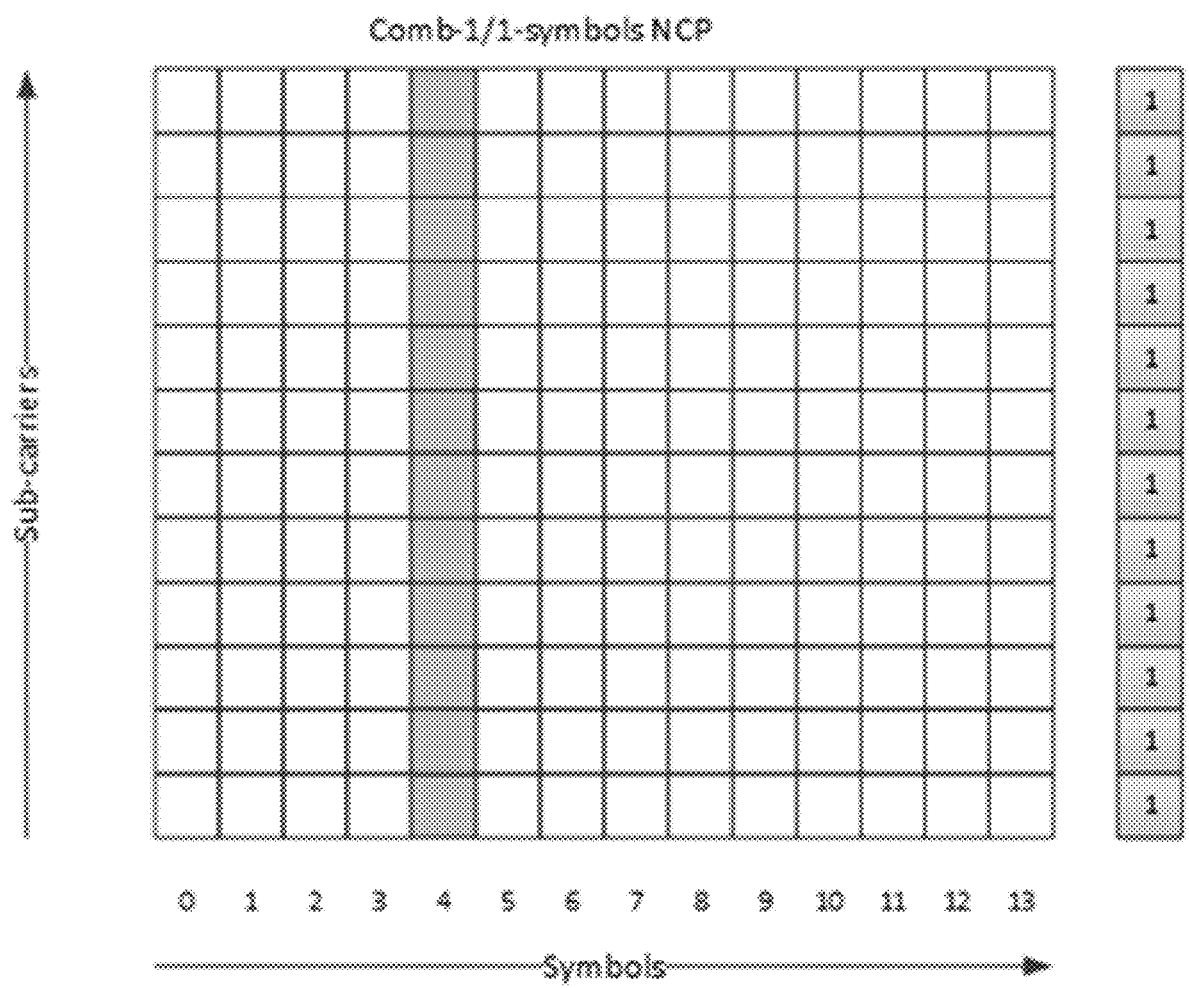
FIG. 5 is an illustration of an example DL-PRS resource element (RE) usage pattern in a resource block (RB) for a comb-1 deployment spanning one symbol, according to an embodiment.

FIG. 5 is an illustration of an example DL-PRS RE usage pattern in an RB for a comb-1 deployment spanning one symbol. Because the DL-PRS occupies all REs for a given symbol, the likelihood of RF interference from other TRPs is reduced. Transmissions from other TRPs would take place in other symbols, separated in time, and thus, according to some embodiments, a UE 105 may determine a reduced interference condition is met if a comb-1 deployment of the DL-PRS is used. The usage of a comb-1 deployment for transmitting the DL-PRS may be indicated to the UE 105 via a BS and/or location server, for example.

According to some embodiments, the determination that a reduced interference condition is met may extend beyond comb-1 deployments. For example, for comb-N deployments (where N≥2) if the UE 105 determines that the likelihood is low that other TRPs will transmit during the symbols in which the DL-PRS is to be transmitted, it can determine that the reduced interference condition is met. Again, this determination may be based on information received via a BS and/or location server. For example, the UE may receive a message from a BS or location server that no other TRPs are scheduled to transmit during the symbols in which a DL-PRS is to be transmitted.

Determining whether the interference condition is met may further be based on whether RF signals concurrent with the DL-PRS can be filtered prior to time-domain processing. That is, according to some embodiments, a simple band-pass filter can be used to filter signals transmitted in the same symbol(s) as the DL-PRS where the signal envelope is fully frequency-division multiplexed with the signal envelope of the DL-PRS. For example, if a DL-PRS is transmitted on subcarriers 1-100 during a set of symbols (in which no other TRP is transmitting on those subcarriers) and a separate TRP transmits a signal during the same set of symbols using subcarriers 101-200, then the UE 105 could use a band-pass filter (or similar filtering technique) to isolate the signal envelope of the DL-PRS and reduce interference, thereby satisfying the interference condition. Again, this determination by the UE 105 that the DL-PRS will be the only signal transmitted in a set of subcarriers for a certain set of symbols, and that other bands of subcarriers may need to be filtered, may be based on information received via a BS and/or location server. Depending on desired functionality, the band-pass filter may be implemented using analog circuitry and/or a hybrid combination of analog and digital circuitry, for example.

According to some embodiments, code isolation may also be used as a factor when determining whether the interference condition is met. In other words, some embodiments may separate signals that occupy the same symbols as the DL-PRS but utilize a different code. For example, a threshold of 20 dB post-correlation isolation of signal A from signal B, the threshold could be compared to (in dB scale): received power of signal A−received power of signal B+cross-correlation isolation between signals A and B. For instance, −110 dBm−(−100 dBm)+35 dB=25 dB>20 dB=threshold. Additional or alternative means for isolating the DL-PRS and satisfying the reduced interference condition may be met.

With regard to the reduced search time window condition, a UE 105 can determine whether a search time window can be reduced below a threshold value based on an accuracy of a location estimate for the UE 105. As noted, unlike frequency-domain processing, time-domain processing can still be effective at determining a correlation peak when using a reduced number of samples. Because samples are taken over the course of a search time window, samples can be reduced when the search time window is reduced. Because the search time window is based on an approximate time at which the DL-PRS is likely to be received, the size (or length in time) of the search time window therefore depends on an accuracy of the location estimate of the UE 105 (which dictates when the DL-PRS is received). And although time-domain processing may be more computationally complex than frequency-domain processing for large search time windows, there may be a threshold search time window value at which time-domain processing becomes more efficient. Thus, according to embodiments, when determining whether to use time-domain processing, a UE 105 can determine whether the window has been reduced sufficient to meet the threshold search time window value. Further, the accuracy or uncertainty of a location estimate can be estimated, as detailed below. The location estimate of the UE may provide the center of a search space, and the location uncertainty estimate may provide the size of the search space (or corresponding search time window) around the center.

FIG. 6 illustrates two tables 610 and 620 showing how the determination of a threshold search time window value may be made. The upper table 610 shows computational complexity, measured by multiply-accumulate operations (MACs). In this example, the DL-PRS uses 3264 subcarriers. Because frequency-domain processing uses FFT/IFFT operations longer than the number of subcarriers, and 4096 is the closest base-2 number that exceeds 3264, MACs for FFT and IFFT of search sizes 4096 are calculated. The MACs are calculated using the previously-mentioned N/2*log 2(N) cost function. MACs for each operation of frequency-domain processing (FFT, Frequency Domain (FD) correlation, IFFT) are calculated separately, and totaled at the bottom row of the upper table 610. Different columns show different DL-PRS deployments, spanning from comb-1 using one symbol to comb-12 using 12 symbols.

Figure 7:
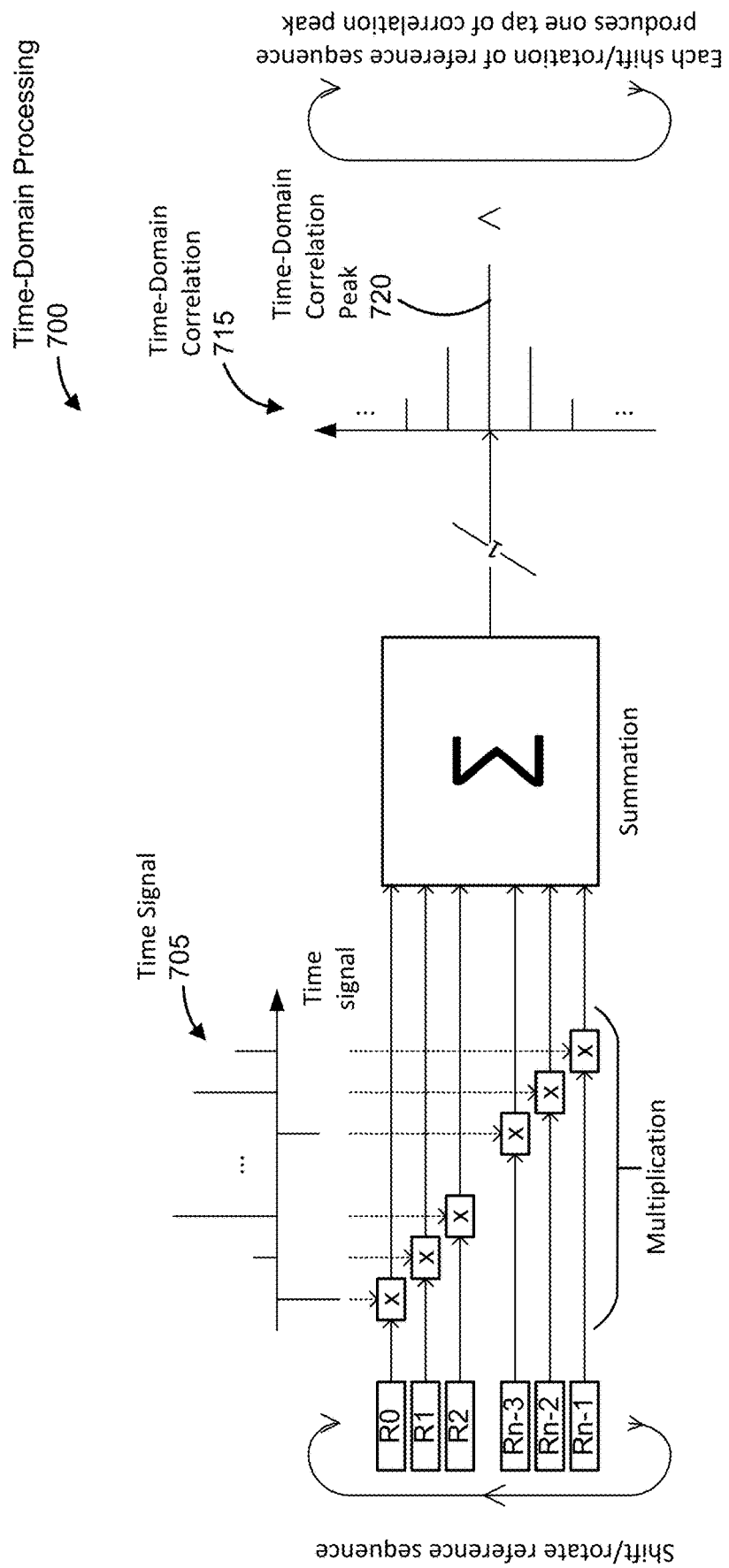
FIG. 7 is a block diagram illustrating time-domain processing, according to an embodiment.

The lower table 620 calculates threshold search time window value for each deployment, in number of taps. This is based on a calculation that time-domain processing would require 4096 MACs per tap. For example, the number of taps for which time-domain processing becomes more computationally efficient than frequency-domain processing for a comb-1 DL-PRS spanning 1 symbol is 12.8 (52,416/4096). For a 15 kHz signal, each tap would be approximately 5 meters (m) (corresponding to $1.66 \times 10^{-8}$ s), meaning the corresponding search time window would span approximately 64 m (5 m×12.8 taps). (An example of how taps are related to sampling rate is illustrated in FIG. 7, which is described in more detail below.) Thus, if the location uncertainty estimate for the UE 105 is approximately ±32 m or less, the UE 105 may use time-domain processing for the DL-PRS. As noted above, in some embodiments, the UE 105 may further determine a reduced interference condition is met before doing so. Depending on desired functionality, the UE may compare a reduced search time window to a threshold search time window value by converting a number of taps to meters (as done in the example above), converting a location uncertainty estimate (e.g., in meters) to taps, or similar methods.

The location estimate for the UE 105 can be determined in any of a variety of ways, and the location uncertainty estimate can be derived therefrom. For example, when asking for assistance data from the LMF 120, the UE 105 may report its serving BS 110-1 and (optionally) any detected neighboring BSs 110. The LMF can then give the UE 105 a search time window for DL-PRS acquisition. In instances in which the search range is smaller than the equivalent threshold search time window value, the UE 105 can then use time-domain processing for the DL-PRS.

It may often be the case where the accuracy of an initial location estimate for the UE 105 is insufficient for time-domain processing. In such instances, the UE 105 may use frequency-domain processing to obtain an initial location estimate. After that, the UE 105 can then enter a tracking mode, referencing detected movement against the initial location estimate, to determine whether time-domain processing may be used for subsequent DL-PRS signal processing. This can include the use of movement sensors (e.g., accelerometers, gyroscopes) of the UE 105 and/or other information indicative of movement to determine location estimate of the UE, a corresponding location uncertainty estimate, and whether the location uncertainty estimate is sufficient to use time-domain processing. For example, based on a time at which an initial DL-PRS correlation peak was detected (e.g., using frequency-domain processing), and based on available sensor data and other indicia of movement available to the UE 105, the UE 105 may determine that, for another DL-PRS occurring 160 ms after the initial DL-PRS, a search time window of only 3-5 taps may be needed, in which case it may be advantageous to use time-domain processing rather than frequency-domain processing. The determination of the reduced search time window may be made at the UE 105 or at the location server (e.g., LMF 120).

It can be noted that the calculations provided in FIG. 6 are theoretical, and other considerations may be taken into account when determining a threshold search time window value. Such considerations can take into account the movement of data and other calculations and/or delays at the UE 105, which may be particular to the processing hardware and/or software of the UE 105. Thus, more generally, the threshold search time window value can be determined by determining the size of the search time window at which the total processing budget (e.g., total MACs used) for time-domain processing becomes smaller than the total processing budget for frequency-domain processing.

FIG. 7 is a block diagram illustrating time-domain processing 700, according to an embodiment. Similar to the frequency-domain processing 400 of FIG. 4, means for performing one or more of the functions illustrated in FIG. 7 can include hardware and/or software components of a UE 105, for example, such as a DSP or other processing unit, which may be standalone components or part of a larger subsystem of the UE 105 (e.g., wireless communication interface or modem).

Similar to the frequency-domain processing 400, the time-domain processing 700 receives an input time signal 705 and outputs a corresponding time-domain correlation 715 with a time-domain correlation peak 720. In time-domain processing 700. However, the processing remains in the time domain with no FFT conversion to, or IFTT conversion from the frequency domain. For a reference sequence having n digits (R0, R1, . . . , Rn-1), n samples of the time signal 705 are taken and processed using a multiplication and summation process in which, each digit is multiplied with a respective sample of the time signal 705 and the results are then summed to produce a correlation value (tap/sample point) on the time-domain correlation 715. The multiplication and summation process is then repeated for a number of taps where, for each repetition, the digits of the reference sequence are shifted by a tap (from a previous repetition). As noted, the number of taps may be based on a reduced search time window size, determined by an location uncertainty estimate of the UE 105.

Figure 8:
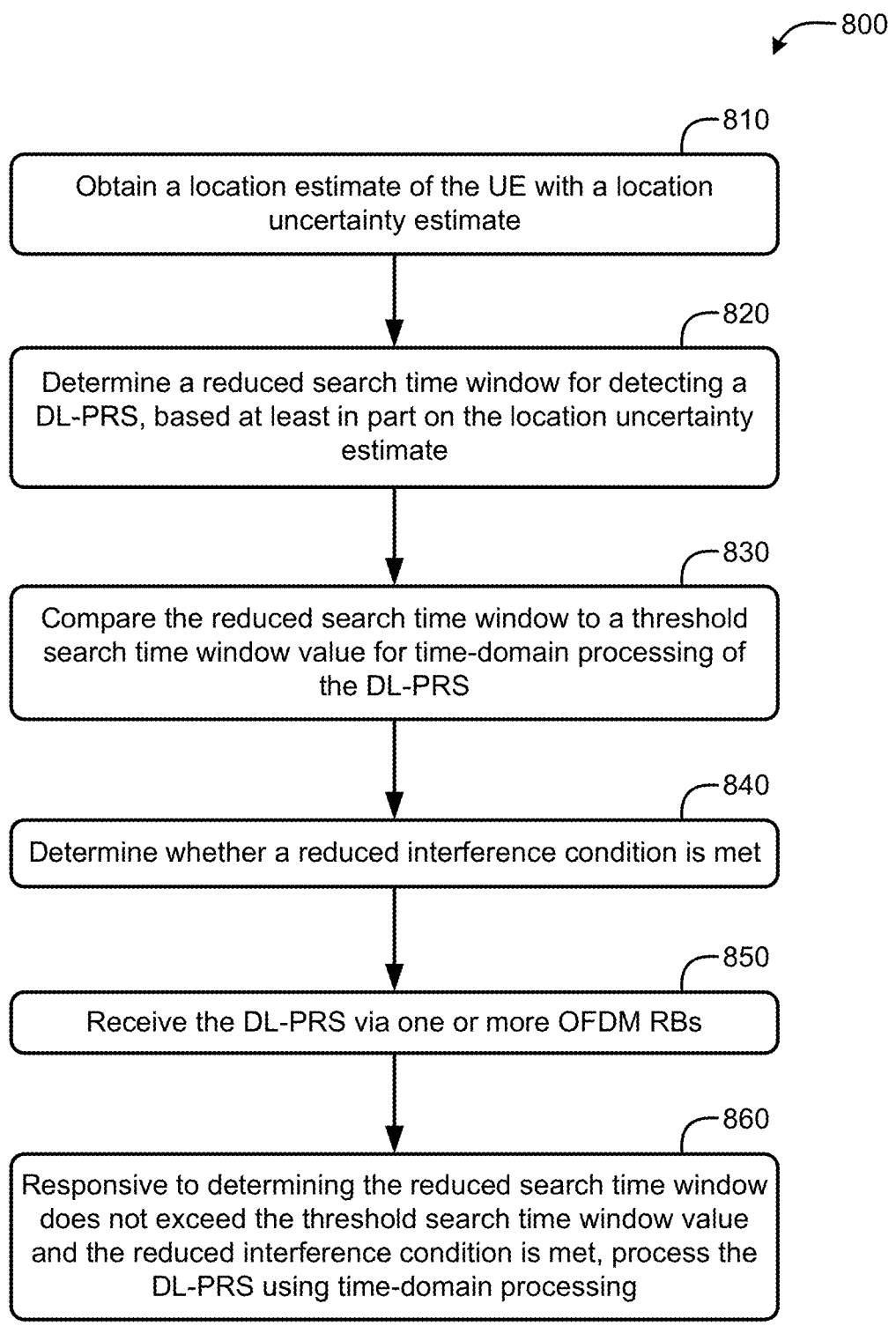
FIG. 8 is a flow diagram of signal processing at a UE, according to an embodiment.
Figure 9:
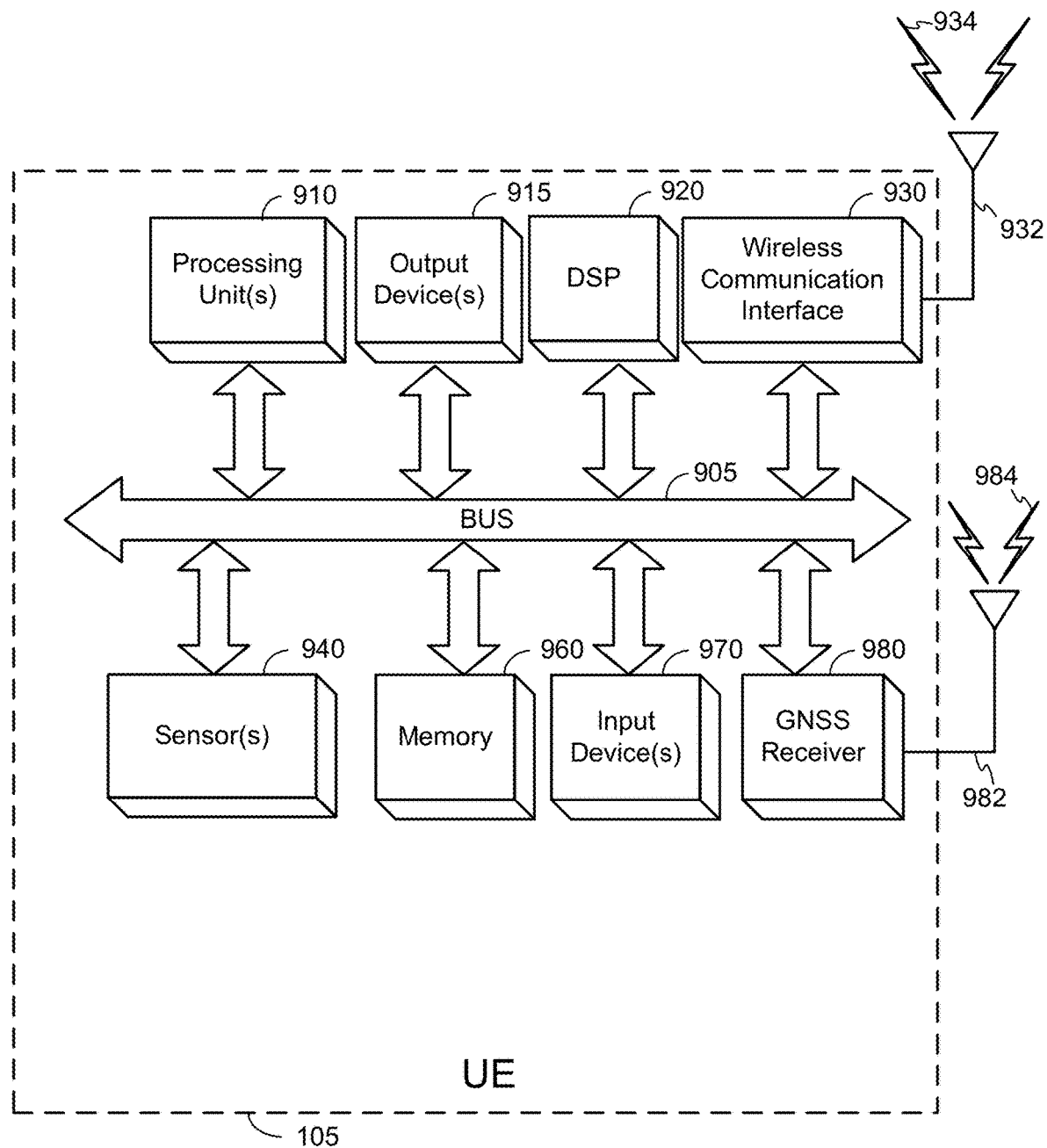
FIG. 9 is a block diagram of an embodiment of a UE, which can be utilized in embodiments as described herein.

FIG. 8 is a flow diagram of signal processing at a UE, according to an embodiment. Again, stated in the embodiments above, a UE may perform signal processing using a DSP or other processing unit (e.g., a baseband processor), which may be included within a wireless communication interface (modem) or other component of the UE. FIG. 9, which is discussed in more detail below, provides an illustration of example components of a UE in FIG. 9.

At block 810, the functionality comprises determining a location estimate of the UE 105 with a corresponding location uncertainty estimate. As previously noted, this can be based on any of a variety of information sources. In some embodiments, for example, a location server may provide the UE with a location estimate based on base station signals detected by the UE and provided to the location server. Location estimates may additionally or alternatively be based on location estimates and/or other location-related information from, for example, a GNSS receiver, a wireless transceiver/network (e.g., Wi-Fi, Bluetooth), or a motion sensor of the UE. As noted, a location uncertainty estimate made a determined based on the means by which the location estimate was determined, a confidence or accuracy of the determination, or the like. Means for performing functionality at block 810 may comprise a wireless communication interface 930, processing unit(s) 910, GNSS receiver 980, sensor(s) 940, and/or other components of a UE 105, as illustrated in FIG. 9.

At block 820, the functionality comprises determining a reduced search time window for detecting a DL-PRS based at least in part on the location uncertainty estimate. As noted in the embodiments described above, a search time window for a DL-PRS to be transmitted can be reduced in cases where a location uncertainty estimate of the UE allows for a more accurate determination of when the DL-PRS will be received by the UE. As such, determining the reduced search time window can comprise determining a location uncertainty estimate. This determination may be based on the type of information used to determine the location estimate, a confidence level related to the information, and the like. As noted, some embodiments may utilize movement information regarding movement of the UE to determine a location of the UE. According to some embodiments, the reduced search time window may be a result of the UE entering a tracking mode after an initial acquisition and/or entering an assisted mode in which the UE receives information from a location server (or other remote device) to reduce search time window size. Means for performing functionality at block 820 may comprise a wireless communication interface 930, DSP 920, processing unit(s) 910, sensor(s) 940, and/or other components of a UE 105, as illustrated in FIG. 9.

The functionality of block 830 comprises comparing the reduced search time window to a threshold search time window value for time-domain processing of the DL-PRS. As previously noted with regard to FIG. 6, the threshold search time window value may be determined based on a comparison of a processing budget for frequency-domain processing of the signal with a processing budget for time-domain processing of the signal for search time window values. More specifically, in some embodiments of the method 800, the threshold search time window value for time-domain processing of the DL-PRS may be determined by determining a search time window value for which a number of MACs used to process the DL-PRS using time-domain processing is less than a number of MACs used to process the DL-PRS using frequency-domain processing. Means for performing functionality at block 830 may comprise a wireless communication interface 930, DSP 920, processing unit(s) 910, and/or other components of a UE 105, as illustrated in FIG. 9.

At block 840, the functionality comprises determining whether a reduced interference condition is met. As indicated in the previously-described embodiments, a reduced interference condition may be met in various ways, including for comb-1 deployments, indications from a location server or BS regarding the absence of other TRP transmissions during the symbol(s) in which the DL-PRS are transmitted, the usage of band-pass filtering to exclude signals in other subcarrier bands, and the like. Thus, according to some embodiments, the method 800 may further comprise determining DL-PRS is received in determining that the reduced interference condition is met comprises determining the DL-PRS is to be received using a comb-1 deployment over a single symbol of the OFDM resource block. According to some embodiments, when the DL-PRS is to be received using a plurality of symbols of the OFDM RB (e.g., comb-N, where N>1), determining that the reduced interference condition is met may comprise receiving a message from a BS or a location server that no other TRPs are scheduled to transmit using the OFDM resource block during each symbol of the plurality of symbols. Additionally or alternatively, embodiments may further comprise using a band-pass filter to filter out RF signals transmitted concurrently with the DL-PRS using one or more additional OFDM RBs. Depending on desired functionality, such band-pass filtering may be implemented in different ways (e.g., RF frequency filters, or baseband filters applied before or after A/D sampling.) Means for performing functionality at block 840 may comprise a wireless communication interface 930, DSP 920, processing unit(s) 910, and/or other components of a UE 105, as illustrated in FIG. 9.

At block 850, the functionality comprises receiving the DL-PRS via one or more OFDM RBs. As previously noted, the DL-PRS may be received by the UE within the reduced search time window, the timing for which may be provided by a location server or BS. Means for performing functionality at block 840 may comprise a wireless communication interface 930, DSP 920, processing unit(s) 910, and/or other components of a UE 105, as illustrated in FIG. 9.

The functionality at block 860 comprises responsive to determining the reduced search time window does not exceed the threshold search time window value and the reduced interference condition is met, processing the DL-PRS using time-domain processing. According to some embodiments the method 800 may further comprise, responsive to determining the reduced search time window exceeds the threshold search time window value, the reduced interference condition is not met, or both, processing the DL-PRS using frequency-domain processing. As described in FIG. 7, time-domain processing may comprise processing in which signal information is kept in the time domain for correlation, rather than being converted to the frequency domain. Some embodiments of the method 800 may therefore further comprise capturing a predetermined number of samples, and performing a multiplication and summation process comprising multiplying each sample with a corresponding digit of a reference sequence, and summing the results of the multiplication for all samples in the predetermined number of samples to determine a respective correlation value. Time-domain processing may further repeat the multiplication and summation process for a number of taps, where: (i) for each repetition, the digits of the reference sequence are shifted from a previous repetition; and (ii) the number of taps is based on a size of the reduced search time window. The time-domain processing may further comprise identifying a correlation peak from the correlation values for all repetitions of the multiplication and shift process. In some embodiments, a second location estimate of the UE may then be determined based at least in part on the time-domain processing. This determination may be made by the UE or by a location server, based on the DL-PRS timing information (measurement) obtained by identifying a correlation peak from time-domain processing. According to some embodiments, the UE may therefore toggle between time-domain processing and frequency-domain processing, based on whether the conditions for the reduced search time window and reduced interference are met in accordance with the method 800.

FIG. 9 illustrates an embodiment of a UE 105, which can be utilized as described herein above (e.g., in association with FIGS. 1-8). For example, the UE 105 can perform one or more of the functions of the method shown in FIG. 8. It should be noted that FIG. 9 is meant only to provide a generalized illustration of various components, any or all of which may be utilized as appropriate. It can be noted that, in some instances, components illustrated by FIG. 9 can be localized to a single physical device and/or distributed among various networked devices, which may be disposed at different physical locations. Furthermore, as previously noted, the functionality of the UE described in the previously-described embodiments, including the time-domain processing illustrated in FIG. 7, may be executed by one or more of the hardware and/or software components illustrated in FIG. 9.

The UE 105 is shown comprising hardware elements that can be electrically coupled via a bus 905 (or may otherwise be in communication, as appropriate). The hardware elements may include a processing unit(s) 910 which can include without limitation one or more general-purpose processors, one or more special-purpose processors (such as DSP chips, graphics acceleration processors, application specific integrated circuits (ASICs), and/or the like), and/or other processing structures or means. As shown in FIG. 9, some embodiments may have a separate DSP 920, depending on desired functionality. Location determination and/or other determinations based on wireless communication may be provided in the processing unit(s) 910 and/or wireless communication interface 930 (discussed below). The UE 105 also can include one or more input devices 970, which can include, without limitation, a keyboard, touch screen, touch pad, microphone, button(s), dial(s), switch(es), and/or the like; and one or more output devices 915, which can include, without limitation, a display, light emitting diode (LED), speakers, and/or the like.

The UE 105 may also include a wireless communication interface 930, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the UE 105 to communicate with other devices as described in the embodiments above. The wireless communication interface 930 may permit data and signaling to be communicated (e.g., transmitted and received) with a network, for example, via eNBs, gNBs, ng-eNBs, APs, various BSs and/or other access node types, and/or other network components, computer systems, and/or any other electronic devices described herein. The communication can be carried out via one or more wireless communication antenna(s) 932 that send and/or receive wireless signals 934. According to some embodiments, the wireless communication antenna(s) 932 may comprise a plurality of discrete antennas, antenna arrays, or any combination thereof. The antenna(s) 932 may be capable of transmitting and receiving wireless signals using beams (e.g., Tx beams and Rx beams). Beam formation may be performed using digital and/or analog beam formation techniques, with respective digital and/or analog circuitry. The wireless communication interface 930 may include such circuitry.

Depending on desired functionality, the wireless communication interface 930 may comprise a separate receiver and transmitter, or any combination of transceivers, transmitters, and/or receivers to communicate with BSs (e.g., ng-eNBs and gNBs) and other terrestrial transceivers, such as wireless devices and APs. The UE 105 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16) network, and so on. A CDMA network may implement one or more RATs such as CDMA2000, WCDMA, and so on. CDMA2000 includes IS-95, IS-2000, and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from the Third Generation Partnership Project (3GPP). CDMA2000 is described in documents from a consortium named "3rd Generation Partnership Project 2" (3GPP2). 3GPP and 3GPP2 documents are publicly available. A WLAN may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 105 can further include sensor(s) 940. Sensors 940 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information, which may be included in positioning state information reports, as described herein.

Embodiments of the UE 105 may also include a GNSS receiver 980 capable of receiving signals 984 from one or more GNSS satellites using an antenna 982 (which could be the same as antenna 932). Positioning based on GNSS signal measurement can be utilized to complement and/or incorporate the techniques described herein. The GNSS receiver 980 can extract a position of the UE 105, using conventional techniques, from GNSS SVs 190 of a GNSS system, such as GPS, Galileo, GLONASS, Quasi-Zenith Satellite System (QZSS) over Japan, IRNSS over India, Beidou over China, and/or the like. Moreover, the GNSS receiver 980 can be used with various augmentation systems (e.g., a Satellite Based Augmentation System (SBAS)) that may be associated with or otherwise enabled for use with one or more global and/or regional navigation satellite systems, (e.g., WAAS, EGNOS, Multi-functional Satellite Augmentation System (MSAS), and Geo Augmented Navigation system (GAGAN), and/or the like).

It can be noted that, although GNSS receiver 980 is illustrated in FIG. 9 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processing units, such as processing unit(s) 910, DSP 920, and/or a processing unit within the wireless communication interface 930 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), a hatch filter, particle filter, or the like. The positioning engine may also be executed by one or more processing units, such as processing unit(s) 910 or DSP 920.

The UE 105 may further include and/or be in communication with a memory 960. The memory 960 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 960 of the UE 105 also can comprise software elements (not shown in FIG. 9), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 960 that are executable by the UE 105 (and/or processing unit(s) 910 or DSP 920 within UE 105). In an aspect, then such code and/or instructions can be used to configure and/or adapt a general-purpose computer (or other device) to perform one or more operations in accordance with the described methods.

Figure 10:
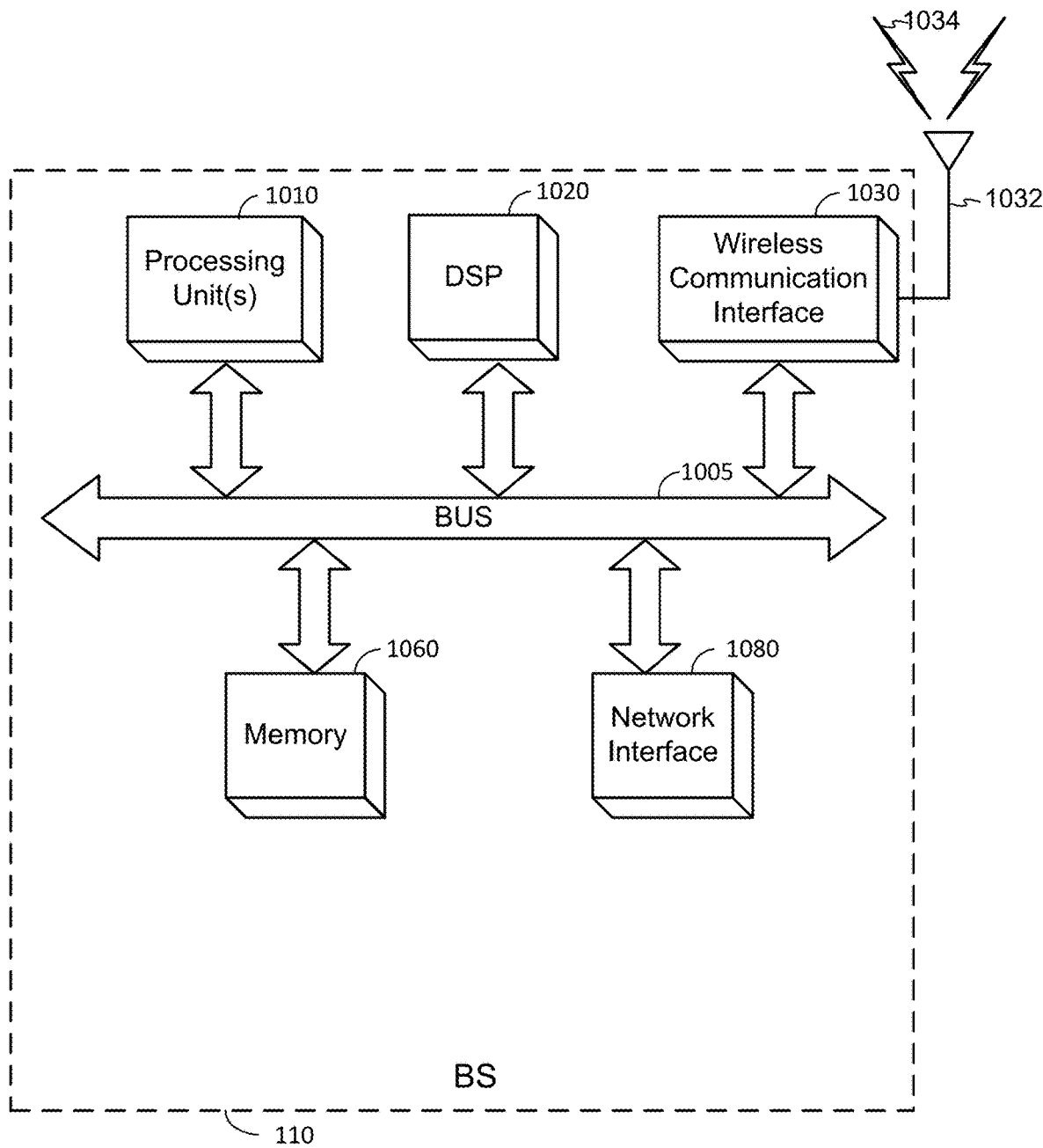
FIG. 10 is a block diagram of an embodiment of a base station, which can be utilized in embodiments as described herein.

FIG. 10 illustrates an embodiment of a BS 110, which can be utilized as described herein above (e.g., in association with FIGS. 1-8) with respect to a BS and/or TRP. It should be noted that FIG. 10 is meant only to provide a generalized illustration of various components, any or all of which may be utilized as appropriate. In some embodiments, the BS 110 may correspond to a gNB, an ng-eNB, and/or an eNB.

The base station 110 is shown comprising hardware elements that can be electrically coupled via a bus 1005 (or may otherwise be in communication, as appropriate). The hardware elements may include a processing unit(s) 1010 which can include, without limitation, one or more general-purpose processors, one or more special-purpose processors (such as DSP chips, graphics acceleration processors, ASICs, and/or the like), and/or other processing structure or means. As shown in FIG. 10, some embodiments may have a separate DSP 1020, depending on desired functionality. Location determination and/or other determinations based on wireless communication may be provided in the processing unit(s) 1010 and/or wireless communication interface 1030 (discussed below), according to some embodiments. The base station 110 also can include one or more input devices, which can include, without limitation, a keyboard, display, mouse, microphone, button(s), dial(s), switch(es), and/or the like; and one or more output devices, which can include, without limitation, a display, LED, speakers, and/or the like.

The base station 110 might also include a wireless communication interface 1030, which may comprise, without limitation, a modem, a network card, an infrared communication device, a wireless communication device, and/or a chipset (such as a Bluetooth® device, an IEEE 802.11 device, an IEEE 802.15.4 device, a Wi-Fi device, a WiMAX device, cellular communication facilities, etc.), and/or the like, which may enable the base station 110 to communicate as described herein. The wireless communication interface 1030 may permit data and signaling to be communicated (e.g., transmitted and received) to UEs, other BSs (e.g., eNBs, gNBs, and ng-eNBs), and/or other network components, computer systems, and/or any other electronic devices described herein. The communication can be carried out via one or more wireless communication antenna(s) 1032 that send and/or receive wireless signals 1034.

The base station 110 may also include a network interface 1080, which can include support of wireline communication technologies. The network interface 1080 may include a modem, network card, chipset, and/or the like. The network interface 1080 may include one or more input and/or output communication interfaces to permit data to be exchanged with a network, communication network servers, computer systems, and/or any other electronic devices described herein.

In many embodiments, the base station 110 may further comprise a memory 1060. The memory 1060 can include, without limitation, local and/or network accessible storage, a disk drive, a drive array, an optical storage device, a solid-state storage device, such as a RAM, and/or a ROM, which can be programmable, flash-updateable, and/or the like. Such storage devices may be configured to implement any appropriate data stores, including without limitation, various file systems, database structures, and/or the like.

The memory 1060 of the base station 110 also may comprise software elements (not shown in FIG. 10), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1060 that are executable by the BS 110 (and/or processing unit(s) 1010 or DSP 1020 within BS 110). In an aspect, then such code and/or instructions can be used to configure and/or adapt a general-purpose computer (or other device) to perform one or more operations in accordance with the described methods.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to: non-volatile media, volatile media, and transmission media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special-purpose computer or a similar special-purpose electronic computing device. In the context of this Specification, therefore, a special-purpose computer or a similar special-purpose electronic computing device is capable of manipulating or transforming signals, typically represented as physical electronic, electrical, or magnetic quantities within memories, registers, or other information storage devices, transmission devices, or display devices of the special-purpose computer or similar special-purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method of signal processing at a User Equipment (UE), the method comprising: obtaining a location estimate of the UE with a corresponding location uncertainty estimate; determining a reduced search time window for detecting a downlink Positioning Reference Signal (DL-PRS), based at least in part on the location uncertainty estimate; comparing the reduced search time window to a threshold search time window value for time-domain processing of the DL-PRS; determining whether a reduced interference condition is met; receiving the DL-PRS via one or more orthogonal frequency-division multiplexing (OFDM) resource blocks; and responsive to determining the reduced search time window does not exceed the threshold search time window value and the reduced interference condition is met, processing the DL-PRS using time-domain processing.

Clause 2. The method of clause 1, wherein determining that the reduced interference condition is met comprises determining the DL-PRS is to be received using a comb-1 deployment over a single symbol of the OFDM resource blocks.

Clause 3. The method of clause 1, wherein the DL-PRS is received using a plurality of symbols of the OFDM resource blocks, and determining that the reduced interference condition is met comprises receiving a message from a base station or a location server that no other TRPs are scheduled to transmit using the OFDM resource blocks during each symbol of the plurality of symbols.

Clause 4. The method of any of clauses 1-3 further comprising, using a band-pass filter to filter out radio frequency (RF) signals transmitted concurrently with the DL-PRS using one or more additional OFDM resource blocks.

Clause 5. The method of any of clauses 1-4, wherein the time-domain processing comprises: capturing a predetermined number of samples; performing a multiplication and summation process comprising: multiplying each sample with a corresponding digit of a reference sequence; and summing results of the multiplication for all samples in the predetermined number of samples to determine a respective correlation value; and repeating the multiplication and summation process for a number of taps, wherein: for each repetition, the digits of the reference sequence are shifted from a previous repetition; and the number of taps is based on a size of the reduced search time window; and identifying a correlation peak from the correlation values for all repetitions of the multiplication and shift process.

Clause 6. The method of any of clauses 1-5, wherein the threshold search time window value for time-domain processing of the DL-PRS is determined by determining a search time window value for which a number of multiply-accumulate operations (MACs) used to process the DL-PRS using time-domain processing is less than a number of MACs used to process the DL-PRS using frequency-domain processing.

Clause 7. The method of any of clauses 1-6 further comprising, determining a second location estimate of the UE based at least in part on the time-domain processing.

Clause 8. The method of any of clauses 1-7 further comprising, determining the location uncertainty estimate.

Clause 9. The method of any of clauses 1-8, wherein determining the reduced search time window is further based on movement information of the UE.

Clause 10. A device comprising a communication interface, a memory, and one or more processing units communicatively coupled with the communication interface and memory and configured to: obtain a location estimate of the UE with a corresponding location uncertainty estimate; determine a reduced search time window for detecting a downlink Positioning Reference Signal (DL-PRS), based at least in part on the location uncertainty estimate; compare the reduced search time window to a threshold search time window value for time-domain processing of the DL-PRS; determine whether a reduced interference condition is met; receive the DL-PRS via one or more orthogonal frequency-division multiplexing (OFDM) resource blocks; and responsive to determining the reduced search time window does not exceed the threshold search time window value and the reduced interference condition is met, process the DL-PRS using time-domain processing.

Clause 11. The device of clause 10, wherein, to determine that the reduced interference condition is met, the one or more processing units are configured to determine the DL-PRS is to be received using a comb-1 deployment over a single symbol of the OFDM resource blocks.

Clause 12. The device of clause 10, wherein the one or more processing units are configured to receive the DL-PRS using a plurality of symbols of the OFDM resource blocks, and, to determine that the reduced interference condition is met, the one or more processing units are configured to receive a message from a base station or a location server that no other TRPs are scheduled to transmit using the OFDM resource blocks during each symbol of the plurality of symbols.

Clause 13. The device of any of clauses 10-12 further comprising, a band-pass filter configured to filter out radio frequency (RF) signals transmitted concurrently with the DL-PRS using one or more additional OFDM resource blocks.

Clause 14. The device of any of clauses 10-13 wherein, to process the DL-PRS using time-domain processing, the one or more processing units are configured to: capture a predetermined number of samples; perform a multiplication and summation process comprising: multiplying each sample with a corresponding digit of a reference sequence; and summing results of the multiplication for all samples in the predetermined number of samples to determine a respective correlation value; and repeat the multiplication and summation process for a number of taps, wherein: for each repetition, the digits of the reference sequence are shifted from a previous repetition; and the number of taps is based on a size of the reduced search time window; and identify a correlation peak from the correlation values for all repetitions of the multiplication and shift process.

Clause 15. The device of any of clauses 10-14, wherein the one or more processing units are further configured to determine the threshold search time window value for time-domain processing of the DL-PRS by determining a search time window value for which a number of multiply-accumulate operations (MACs) used to process the DL-PRS using time-domain processing is less than a number of MACs used to process the DL-PRS using frequency-domain processing.

Clause 16. The device of any of clauses 10-15, wherein the one or more processing units are further configured to determine a second location estimate of the UE based at least in part on the time-domain processing.

Clause 17. The device of any of clauses 10-16, wherein the one or more processing units are further configured to determine the location uncertainty estimate.

Clause 18. The device of any of clauses 10-17, wherein the one or more processing units are further configured to base the determination of the reduced search time window on movement information of the UE.

Clause 19. A device comprising: means for obtaining a location estimate of a user equipment (UE) with a corresponding location uncertainty estimate; means for determining a reduced search time window for detecting a downlink Positioning Reference Signal (DL-PRS), based at least in part on the location uncertainty estimate; means for comparing the reduced search time window to a threshold search time window value for time-domain processing of the DL-PRS; means for determining whether a reduced interference condition is met; means for receiving the DL-PRS via one or more orthogonal frequency-division multiplexing (OFDM) resource blocks; and means for processing the DL-PRS using time-domain processing, responsive to determining the reduced search time window does not exceed the threshold search time window value and the reduced interference condition is met.

Clause 20. The device of clause 19, wherein the means for determining that the reduced interference condition is met comprises means for determining the DL-PRS is to be received using a comb-1 deployment over a single symbol of the OFDM resource blocks.

Clause 21. The device of clause 19 further comprising, means for receiving the DL-PRS using a plurality of symbols of the OFDM resource blocks, and wherein the means for determining that the reduced interference condition is met comprises means for receiving a message from a base station or a location server that no other TRPs are scheduled to transmit using the OFDM resource blocks during each symbol of the plurality of symbols.

Clause 22. The device of any of clauses 19-21 further comprising, means for filtering out radio frequency (RF) signals transmitted concurrently with the DL-PRS using one or more additional OFDM resource blocks.

Clause 23. The device of any of clauses 19-22, wherein the means for processing the DL-PRS using time-domain comprises: means for capturing a predetermined number of samples; means for performing a multiplication and summation process comprising: multiplying each sample with a corresponding digit of a reference sequence; and summing results of the multiplication for all samples in the predetermined number of samples to determine a respective correlation value; and means for repeating the multiplication and summation process for a number of taps, wherein: for each repetition, the digits of the reference sequence are shifted from a previous repetition; and the number of taps is based on a size of the reduced search time window; and means for identifying a correlation peak from the correlation values for all repetitions of the multiplication and shift process.

Clause 24. The device of any of clauses 19-23 further comprising, means for determining the threshold search time window value for time-domain processing of the DL-PRS by determining a search time window value for which a number of multiply-accumulate operations (MACs) used to process the DL-PRS using time-domain processing is less than a number of MACs used to process the DL-PRS using frequency-domain processing.

Clause 25. The device of any of clauses 19-24 further comprising, means for determining a second location estimate of the UE based at least in part on the time-domain processing.

Clause 26. The device of any of clauses 19-25 further comprising, means for determining the location uncertainty estimate.

Clause 27. The device of any of clauses 19-26, wherein the means for determining the reduced search time window comprise means for basing the determination of the reduced search time window on movement information of the UE.

Clause 28. A non-transitory computer-readable medium having instructions embedded therewith, which, when executed by one or more processing units, cause the one or more processing units to: obtain a location estimate of a user equipment (UE) with a corresponding location uncertainty estimate; determine a reduced search time window for detecting a downlink Positioning Reference Signal (DL-PRS), based at least in part on the location uncertainty estimate; compare the reduced search time window to a threshold search time window value for time-domain processing of the DL-PRS; determine whether a reduced interference condition is met; receive the DL-PRS via one or more orthogonal frequency-division multiplexing (OFDM) resource blocks; and responsive to determining the reduced search time window does not exceed the threshold search time window value and the reduced interference condition is met, process the DL-PRS using time-domain processing.

What is claimed is:

1. A method of signal processing at a User Equipment (UE), the method comprising:
   obtaining a location estimate of the UE with a location uncertainty estimate;
   determining a reduced search time window for detecting a downlink Positioning Reference Signal (DL-PRS), based at least in part on the location uncertainty estimate;
   comparing the reduced search time window to a threshold search time window value for time-domain processing of the DL-PRS;
   determining whether a reduced interference condition is met;
   receiving the DL-PRS via one or more orthogonal frequency-division multiplexing (OFDM) resource blocks; and
   responsive to determining the reduced search time window does not exceed the threshold search time window value and the reduced interference condition is met, processing the DL-PRS using time-domain processing.

2. The method of claim 1, wherein determining that the reduced interference condition is met comprises determining the DL-PRS is to be received using a comb-1 deployment over a single symbol of the OFDM resource blocks.

3. The method of claim 1, wherein the DL-PRS is received using a plurality of symbols of the OFDM resource blocks, and determining that the reduced interference condition is met comprises receiving a message from a base station or a location server that no other TRPs are scheduled to transmit using the OFDM resource blocks during each symbol of the plurality of symbols.

4. The method of claim 1, further comprising using a band-pass filter to filter out radio frequency (RF) signals transmitted concurrently with the DL-PRS using one or more additional OFDM resource blocks.

5. The method of claim 1, wherein the time-domain processing comprises:
   capturing a predetermined number of samples;
   performing a multiplication and summation process comprising:
      multiplying each sample with a corresponding digit of a reference sequence; and
      summing results of the multiplication for all samples in the predetermined number of samples to determine a correlation value;
   repeating the multiplication and summation process for a number of taps, wherein:
      for each repetition, the digits of the reference sequence are shifted from a previous repetition; and
      the number of taps is based on a size of the reduced search time window; and
   identifying a correlation peak from the correlation values for all repetitions of the multiplication and shift process.

6. The method of claim 1, wherein the threshold search time window value for time-domain processing of the DL-PRS is determined by determining a search time window value for which a number of multiply-accumulate operations (MACs) used to process the DL-PRS using time-domain processing is less than a number of MACs used to process the DL-PRS using frequency-domain processing.

7. The method of claim 1, further comprising determining a second location estimate of the UE based at least in part on the time-domain processing.

8. The method of claim 1, further comprising determining the location uncertainty estimate.

9. The method of claim 1, wherein determining the reduced search time window is further based on movement information of the UE.

10. A device comprising:
    a communication interface;
    a memory; and
    one or more processing units communicatively coupled with the communication interface and memory and configured to:
       obtain a location estimate of the UE with a location uncertainty estimate;
       determine a reduced search time window for detecting a downlink Positioning Reference Signal (DL-PRS), based at least in part on the location uncertainty estimate;
       compare the reduced search time window to a threshold search time window value for time-domain processing of the DL-PRS;
       determine whether a reduced interference condition is met;

receive the DL-PRS via one or more orthogonal frequency-division multiplexing (OFDM) resource blocks; and responsive to determining the reduced search time window does not exceed the threshold search time window value and the reduced interference condition is met, process the DL-PRS using time-domain processing.

11. The device of claim 10, wherein, to determine that the reduced interference condition is met, the one or more processing units are configured to determine the DL-PRS is to be received using a comb-1 deployment over a single symbol of the OFDM resource blocks.

12. The device of claim 10, wherein the one or more processing units are configured to receive the DL-PRS using a plurality of symbols of the OFDM resource blocks, and, to determine that the reduced interference condition is met, the one or more processing units are configured to receive a message from a base station or a location server that no other TRPs are scheduled to transmit using the OFDM resource blocks during each symbol of the plurality of symbols.

13. The device of claim 10, further comprising a bandpass filter configured to filter out radio frequency (RF) signals transmitted concurrently with the DL-PRS using one or more additional OFDM resource blocks.

14. The device of claim 10, wherein, to process the DL-PRS using time-domain processing, the one or more processing units are configured to:
capture a predetermined number of samples;
perform a multiplication and summation process comprising:
multiplying each sample with a corresponding digit of a reference sequence; and
summing results of the multiplication for all samples in the predetermined number of samples to determine a correlation value; and
repeat the multiplication and summation process for a number of taps, wherein:
for each repetition, the digits of the reference sequence are shifted from a previous repetition; and
the number of taps is based on a size of the reduced search time window; and
identify a correlation peak from the correlation values for all repetitions of the multiplication and shift process.

15. The device of claim 10, wherein the one or more processing units are further configured to determine the threshold search time window value for time-domain processing of the DL-PRS by determining a search time window value for which a number of multiply-accumulate operations (MACs) used to process the DL-PRS using time-domain processing is less than a number of MACs used to process the DL-PRS using frequency-domain processing.

16. The device of claim 10, wherein the one or more processing units are further configured to determine a second location estimate of the UE based at least in part on the time-domain processing.

17. The device of claim 10, wherein the one or more processing units are further configured to determine the location uncertainty estimate.

18. The device of claim 10, wherein the one or more processing units are further configured to base the determination of the reduced search time window on movement information of the UE.

19. A device comprising:
means for obtaining a location estimate of a user equipment (UE) with a location uncertainty estimate;
means for determining a reduced search time window for detecting a downlink Positioning Reference Signal (DL-PRS), based at least in part on the location uncertainty estimate;
means for comparing the reduced search time window to a threshold search time window value for time-domain processing of the DL-PRS;
means for determining whether a reduced interference condition is met;
means for receiving the DL-PRS via one or more orthogonal frequency-division multiplexing (OFDM) resource blocks; and
means for processing the DL-PRS using time-domain processing, responsive to determining the reduced search time window does not exceed the threshold search time window value and the reduced interference condition is met.

20. The device of claim 19, wherein the means for determining that the reduced interference condition is met comprises means for determining the DL-PRS is to be received using a comb-1 deployment over a single symbol of the OFDM resource blocks.

21. The device of claim 19, further comprising means for receiving the DL-PRS using a plurality of symbols of the OFDM resource blocks, and wherein the means for determining that the reduced interference condition is met comprises means for receiving a message from a base station or a location server that no other TRPs are scheduled to transmit using the OFDM resource blocks during each symbol of the plurality of symbols.

22. The device of claim 19, further comprising means for filtering out radio frequency (RF) signals transmitted concurrently with the DL-PRS using one or more additional OFDM resource blocks.

23. The device of claim 19, wherein the means for processing the DL-PRS using time-domain comprises:
means for capturing a predetermined number of samples;
means for performing a multiplication and summation process comprising:
multiplying each sample with a corresponding digit of a reference sequence; and
summing results of the multiplication for all samples in the predetermined number of samples to determine a correlation value; and
means for repeating the multiplication and summation process for a number of taps, wherein:
for each repetition, the digits of the reference sequence are shifted from a previous repetition; and
the number of taps is based on a size of the reduced search time window; and
means for identifying a correlation peak from the correlation values for all repetitions of the multiplication and shift process.

24. The device of claim 19, further comprising means for determining the threshold search time window value for time-domain processing of the DL-PRS by determining a search time window value for which a number of multiply-accumulate operations (MACs) used to process the DL-PRS using time-domain processing is less than a number of MACs used to process the DL-PRS using frequency-domain processing.

25. The device of claim 19, further comprising means for determining a second location estimate of the UE based at least in part on the time-domain processing.

26. The device of claim 19, further comprising means for determining the location uncertainty estimate.

27. The device of claim 19, wherein the means for determining the reduced search time window comprise means for basing the determination of the reduced search time window on movement information of the UE.

28. A non-transitory computer-readable medium having instructions embedded therewith, which, when executed by one or more processing units, cause the one or more processing units to:
- obtain a location estimate of a user equipment (UE) with a location uncertainty estimate;
- determine a reduced search time window for detecting a downlink Positioning Reference Signal (DL-PRS), based at least in part on the location uncertainty estimate;
- compare the reduced search time window to a threshold search time window value for time-domain processing of the DL-PRS;
- determine whether a reduced interference condition is met;
- receive the DL-PRS via one or more orthogonal frequency-division multiplexing (OFDM) resource blocks; and
- responsive to determining the reduced search time window does not exceed the threshold search time window value and the reduced interference condition is met, process the DL-PRS using time-domain processing.

* * * * *